Oct. 3, 1939.   J. V. STEVENS   2,174,849
METHOD FOR TREATING OIL EMULSIONS
Filed Aug. 10, 1935   2 Sheets-Sheet 1

Inventor
J. V. Stevens,
By Eugene E. Stevens
Attorney

Oct. 3, 1939.   J. V. STEVENS   2,174,849
METHOD FOR TREATING OIL EMULSIONS
Filed Aug. 10, 1935   2 Sheets-Sheet 2
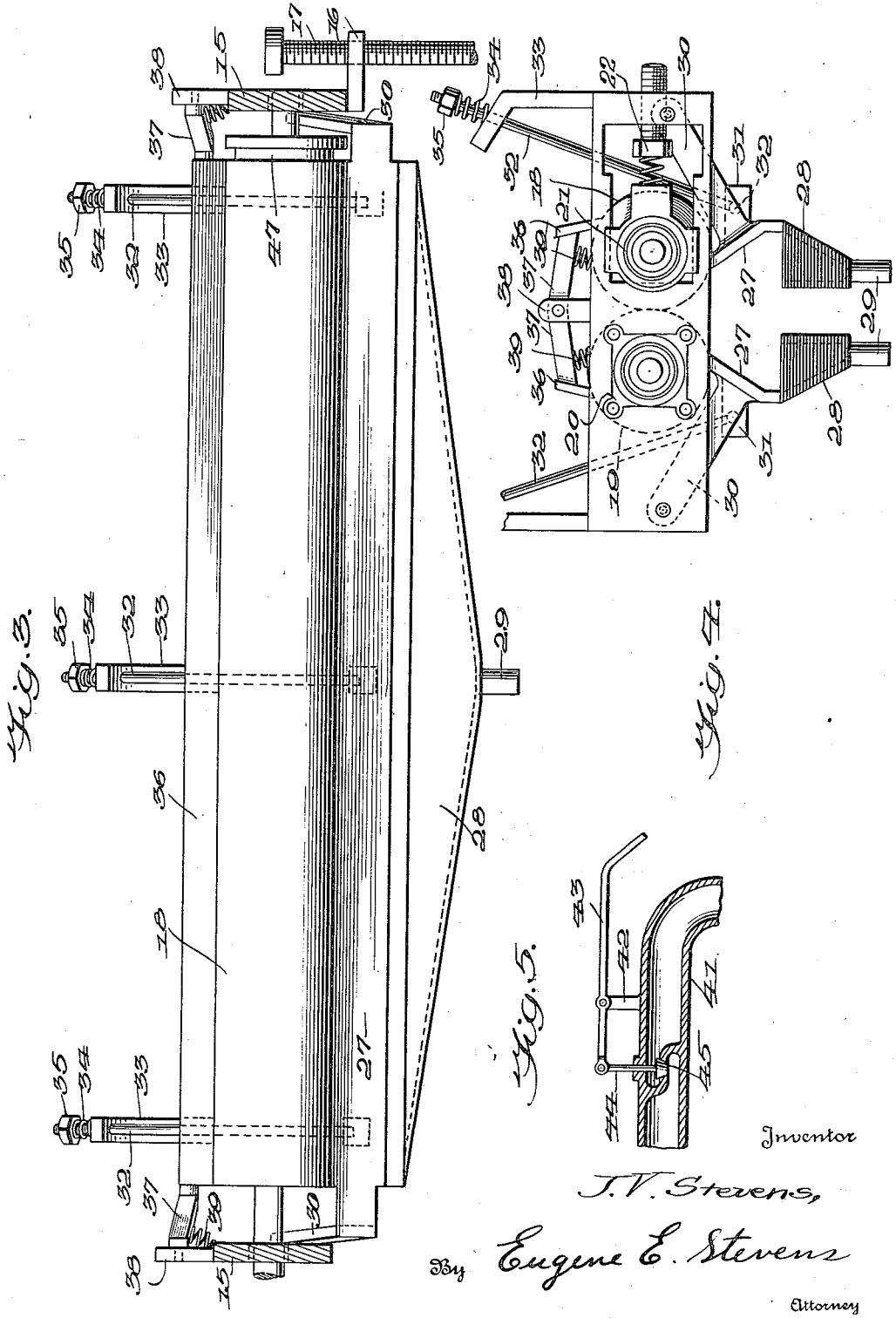
Inventor
J. V. Stevens,
By Eugene E. Stevens
Attorney Patented Oct. 3, 1939

2,174,849

UNITED STATES PATENT OFFICE 2,174,849

METHOD FOR TREATING OIL EMULSIONS

Jesse V. Stevens, Sapulpa, Okla.

Application August 10, 1935, Serial No. 35,678

3 Claims. (Cl. 196—3)

My invention relates to a novel method for breaking down and separating out the components of emulsions, mixtures and the like, and while susceptible of other applications, finds a field of especial utility in the treatment of oil emulsions such as B. S. (basic sediment) to separate out the water and recover the oil.

The problem of breaking down petroleum and water emulsions such as B. S. and emulsions of a more flocculent character has long been a source of difficulty to those working in the petroleum industry. Heretofore it has been proposed to subject a petroleum emulsion to chemical treatment, or heat treatment, or electrical treatment, or physical treatment, either singly or in various combinations for breaking up the oil film-encased water globules. Such practice requires expensive apparatus and the processes require considerable time for consummation, especially since it is necessary as an adjunct to the treatment that the treated emulsion be allowed to stand in a settling tank for the purpose of giving the oil an opportunity to rise to the surface so that it can be drawn off leaving the water at the bottom.

Furthermore, in point of efficiency the heretofore existing practices referred to leave much to be desired.

Having in mind the practices and incident problems above referred to, my invention has for its primary object to provide a process and apparatus for breaking down emulsions and the like which is much more efficient than prior practices and apparatus, less expensive, eliminates necessity for chemical or electrical treatment for the emulsion or the like, and which process, in that it eliminates the necessity for a settling tank and effects initial separation of the oil and water may be much more quickly carried out than heretofore existing practices.

The invention resides in various steps of the process, and in combinations of such steps; also in certain novel features of construction, combination and arrangement of the various parts of the apparatus, all as hereinafter described and pointed out with particularity in the claims.

In accordance with the patent practice I have illustrated herein one form of apparatus for carrying out my process.

In the drawings:

Figure 3 is an enlarged elevation of a roll and scraper mount;

Figure 4 is an end view of the roll and scraper assembly; and

Figure 5 is a sectional detail illustration of a feed control valve employed.

Figures 1, 2:
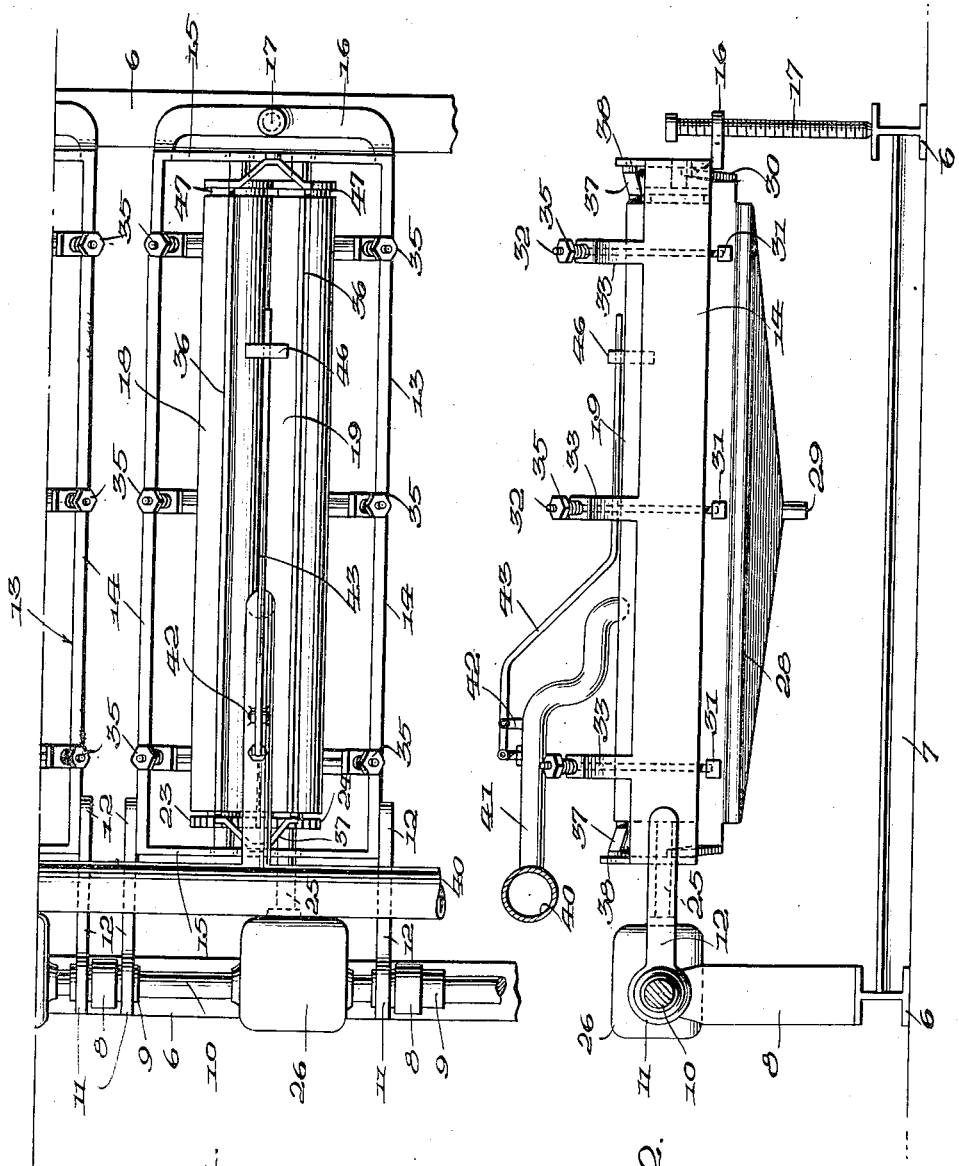
Figure 1 is a top plan view of an apparatus as constructed in accordance with the invention.
Figure 2 is a side elevation thereof.

The process which is the subject of my invention consists in the mechanical removal of a constituent of the emulsion (oil for instance) by subjecting the emulsion to the action of a moving surface for which such constituent has a preferential affinity,—or in other words to which such constituent will adhere; and in the same operation carrying off to another place the other constituents or constituent of the emulsion (water for instance). Assuming the first mentioned constituent to be oil and the second constituent water, globules of which latter are enveloped or encased in a covering of the oil, the movement of a surface for which oil has an affinity will by adhesion catch the oil and then the cohesion of the adjacent globules or portions of oil with one another,—or perhaps more properly due to the surface tension of the oil, results in the oil envelopes or casings being pulled from the globules of water thus freeing them so that they may be drawn or carried off to a place different from that to which the moving surface carries the oil. It is to be understood that in all water in oil emulsions there will be some cohesion of adjacent water globule-carrying oil envelopes.

In carrying out the process it has been found desirable for practical commercial purposes to employ in connection with the moving surface for which the oil has an affinity, another surface adjacent thereto and forming an acute angle therewith so that the action of the moving surface tends to cause a pinching of the conglomeration of oil-encased water globules. This pinching action serves to facilitate the breaking up of the water-carrying oil globules; and furthermore the arrangement of such surfaces makes, as it were, a trough-like structure which results in the water being coalesced therein; and said surfaces may be arranged so as to provide a fall in the direction of one end thereof so that the released water may be carried off and deposited into a container or tank at the lower end of such surfaces while the oil, as previously indicated, will be carried by the moving surface and removed therefrom and deposited in a different container. While, as stated, at the end of the preceding paragraph herein, the adjacent oil envelopes of all oil in water emulsions tend to cohere with one another, yet such coherence is non-essential to the breaking of said envelopes by adherence to oil-wetted rolls or the like where the water globule is large and the oil envelope relatively thin; or when there is a pinching of the globules of oil-enveloped water between two rolls.

For commercial purposes it has been found desirable to use the apparatus disclosed in the accompanying drawings to which detailed reference will now be had.

A preferred form of apparatus comprises a base frame or support consisting of spaced parallel I-beams 6 braced at appropriate intervals by transverse struts 7, one of the beams 6 carrying at spaced intervals a plurality of upright standards 8 providing bearing sleeves 9 for a drive shaft 10 driven from a power source, not shown.

The sleeves 9 extend oppositely from their mounting standards to provide bearings for eyes 11 on the ends of parallel arms 12, adjacent pairs of which are rigidly attached at their opposite ends to the sides of a substantially rectangular cradle frame 13, a number of such frames being disposed in parallel spaced relation along the base to constitute a battery of treating units.

Each frame 13 consists of parallel side bars 14 and end bars 15. At its outer end the frame is provided with lug means 16 having threaded travel connection with a jack screw 17 bearing on the subjacent beam 6, whereby the frame may be tilted through a vertical arc on the pivot formed by the eyes 11 on the bearing sleeves 9.

Extending longitudinally in the cradle frame is a pair of parallel, oppositely rotatable contacting rolls 18 and 19 having their pintles respectively journalled in bearing blocks mounted in the end walls 15. One of these blocks, 20, for the roll 19 is shown in Figure 4, the bearing block 21 for the roll 18 being slidable in the end bar for tension adjustment by the usual tension nut and spring means generally indicated as at 22. The rolls may be of any desired material but I find it preferable to utilize hard rubber for one roll and chrome steel for the other.

At the inner end of the frame the rolls are geared together for opposite rotation by meshed gears 23 and 24, the pintle of roll 19 extending as a shaft 25 to a gear housing 26 rotatable on shaft 10 and containing the conventional gearing connection for imparting drive from shaft 10 to the roll shaft 25 for driving the rolls.

Beneath each roll there is provided a scraper and trough assembly comprising a scraper blade 27 extending the full length of each roll and carrying a collecting trough 28 inclined downwardly from each end to the center and having thereat a discharge spout 29. The troughs are so located with respect to the scrapers that they lie directly beneath each scraper. At each end of the frame the scraper plates are swung by means of links 30 rigidly connected at one end to the scraper plate and at the other end having pivotal connection with and adjacent one end of the frame end bar 15. At longitudinally spaced intervals the rear face of each scraper blade or plate 27 is provided with laterally extending lugs 31, each of which has a pivotal connection with the lower end of an eye bolt 32 which has its upper threaded end passed through an appropriately angled portion of an upright 33 extending from the adjacent frame side bar 14. The end of the eye bolt is surrounded by an expansion spring 34 bearing between the angled portion of the upright 33 and against an adjusting nut 35 threaded over the end of the bolt. By this arrangement the scrapers are maintained in contact with the under faces of the roll and under a tension which is adjustable by means of the nuts 35.

In conjunction with the bottom scrapers 27 I provide a pair of top scrapers 36 which likewise extend the entire length of the rolls and which are supported by end links 37 rigidly connected at one end to the scrapers 36 and at the other end having a pivotal connection with a standard 38 mounted on the adjacent frame end bar 15. Springs 39 are provided between the links and the frame end bar to secure a tension upon the scraper blade.

Above the inner or feed end of the frame extends a feed pipe 40 arranged in spaced relation above the frame and substantially parallel with the supporting base beams 6. By means of a sliding sleeve joint the feed pipe 40 connects with a lateral feed branch pipe 41 that extends longitudinally of the roll immediately above the center of the trough provided by the converging faces of the contacting rolls. The pipe 41 is provided with a standard 42 which provides a fulcrum for a feed control lever 43, the inner end of which is pivotally connected with the stem 44 of a feed control valve 45 located in the feed pipe 41, as shown in Figure 5. Beyond its fulcrum the lever 43 is angled downwardly for a short distance and is then turned to extend substantially parallel with the roll so that it lies within or slightly above the trough formed between the two rolls. At its outer end the lever 43 carries a float 46 so shaped that it extends downwardly into the trough between the rolls.

At their outer ends, beyond the respective scraper blades, the rolls 18 and 19 are circumferentially grooved to provide registering channels 47 which, as best is shown in Figure 1, provide a space between the rolls through which drainage may be effected. It will be understood that in setting the apparatus the outer or free end of the cradle frame is slightly depressed so that the rolls are disposed at an incline downwardly from their inner to their outer ends. By manipulation of the jack screw 17 this angle of inclination may be set to any desired degree.

In the operation of the apparatus the material to be treated, such as the emulsion previously referred to, is fed through the pipe 40 and the branch pipe 41 to discharge over the upper end of the inclined trough provided between the contacting rolls. As these rolls are in close contact and rotate in opposite directions the oil will adhere to the roll surfaces, squeezing out the water, and the oil will pass through the contacting rolls as a thin film while the water collecting in the trough above the contacting faces travels by gravity downwardly along the trough to discharge through the registering channels 47 from which point it may be led off as desired. The oil is drawn through the rolls as a thin film while the water is separated out and decanted off above the roll. The thin film of oil on the roll surfaces is scraped therefrom by means of the scraper blades previously described and deposited in the collecting trough from which the oil is led off through the spout 29 to be collected by any desired means. The top scrapers prevent undue splashing of the emulsion and cooperate with the bottom scrapers in removing the oil film from the contacting roll surfaces.

It is to be understood that the teeth of the gears 23—24 will be sufficiently long to assure meshing engagement in the different adjusted positions of the rolls 18 and 19. Also the frame 13 will provide suitable guards or upper scrapers to prevent the emulsion that is deposited in the trough or bight between the rolls from slopping over into the water tank below.

As will be evident, the method and apparatus are both very simple. It has been found in practice that an apparatus unit involving rolls 5 feet long and approximately 6 inches in diameer, driven at approximately 700 R. P. M. with the rolls providing a 30 degree fall n the direction of one end, will have a capacity of a hundred barrels per day. By proper regulation of the flow of emulsion to the rolls in proportion to the capacity of same, substantially complete recovery of all oil can be had. In respect to this the point, of course, is that the feed of emulsion must be so regulated that the rolls will be able to take up all of the oil and transmit same to the scrapers before any oil has run down with the water to the outlet groove 15 in one of the rolls 7 and this is accomplished by the automatic float controlled feed valve.

Of course, the above described unit is but a single example of my invention and the size, R. P. M., and so on set forth in the description thereof is understood to be illustrative only. In practice units having larger or smaller capacities might be used.

What I claim is:

1. The method of separating a petroleum emulsion of water in oil comprising moving the emulsion against adjacent parallel oppositely rotating rolls whose surfaces are preferentially wettable by oil, squeezing the water from the emulsion by the adhesive action of the rolls on the oil, passing the oil by cohesion and adhesion through the rolls in a film on same and away from the water, and separately collecting the oil and water.

2. The method of separating a petroleum emulsion of water in oil, comprising passing the emulsion longitudinally in the bight between oppositely rotatable parallel and closely adjacent roll means to each of which the oil preferentially adheres, rotating the roll means to pull the oil by mechanical pinching and cohesion from the water globules, removing the liberated water by gravity at one side of the rolls, and removing the oil from the rolls at the opposite side.

3. The method of separating a tight petroleum emulsion of water in oil wherein there is cohesion between adjacent water globule encasing oil envelopes, comprising flowing the emulsion longitudinally between and along parallel oppositely rotatable contacting rolls, to each of which the oil preferentially adheres, rotating the rolls to pull the oil from the water globules by adhesion and cohesion and in a direction perpendicular to the roll axes, removing the water from one side of the rolls by gravity as liberated and in a direction parallel to the roll axes, and removing the oil from the rolls at the opposite side thereof.

JESSE V. STEVENS.